G. P. GREENOE.
PACKING.
APPLICATION FILED JAN. 8, 1917.
1,246,089.
Patented Nov. 13, 1917.
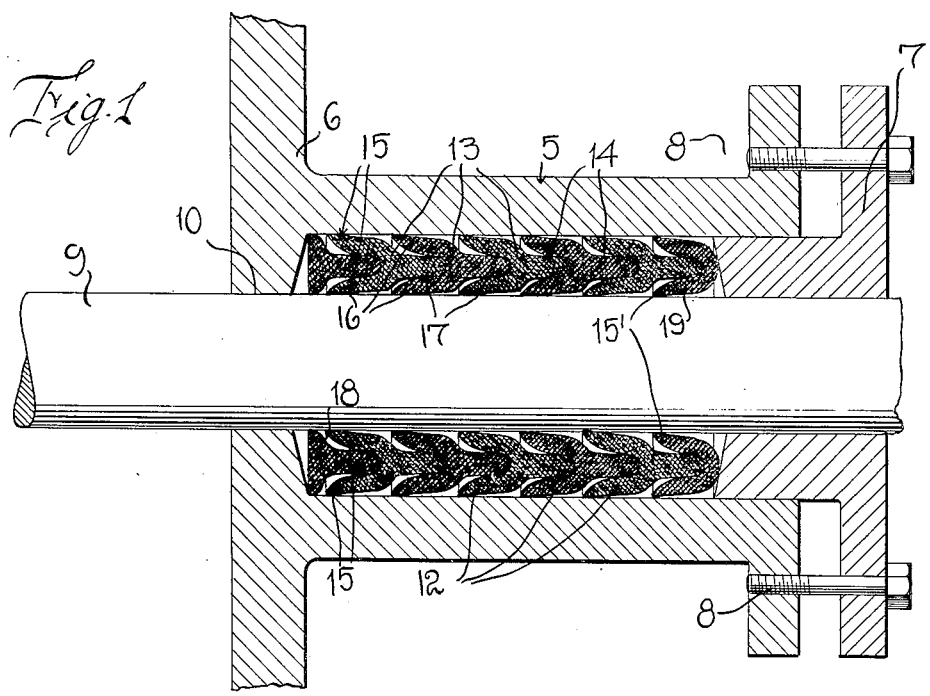
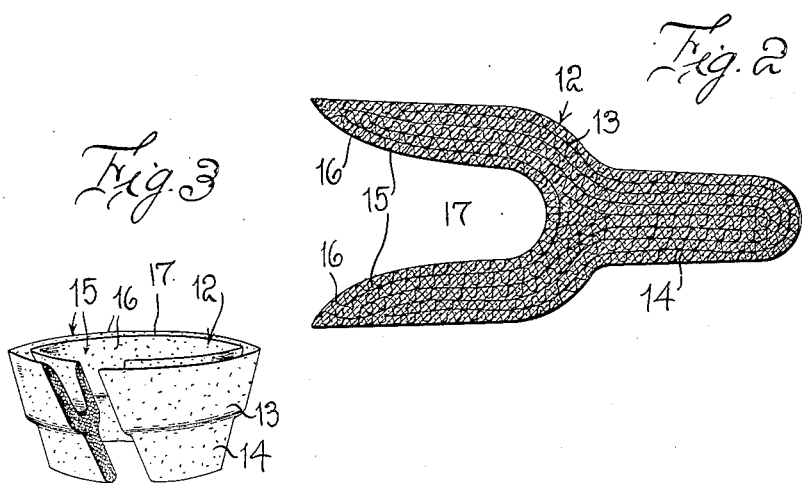
Inventor
GEORGE P. GREENOE
By Watson E. Coleman
Attorney

UNITED STATES PATENT OFFICE.

GEORGE PHILIP GREENOE, OF ATLANTA, GEORGIA.

PACKING.

1,246,089.   Specification of Letters Patent.   Patented Nov. 13, 1917.

Application filed January 8, 1917. Serial No. 141,243.

*To all whom it may concern:*

Be it known that I, GEORGE P. GREENOE, a citizen of the United States, residing at Atlanta, in the county of Fulton and State of Georgia, have invented certain new and useful Improvements in Packing, of which the following is a specification, reference being had to the accompanying drawings.

This invention relates to an improved packing and has for its primary object to provide a form of packing which is of such construction that it will maintain an absolutely fluid-tight barrier between the periphery of the piston rod and the wall of the stuffing box in which the packing is arranged, while at the same time there will be comparatively little wear on the packing, the periphery of the piston rod, or the stuffing box wall.

It is another and more particular object of the invention to provide a molded packing ring having a thick medial section, a rigid, annular edge portion projecting in one direction from said medial section, and diverging, annular lips projecting in the opposite direction from said medial section and providing between them an annular chamber adapted to receive the pressure fluid, whereby the fluid will act against the relatively yieldable lips and tightly engage the edges of said lips against the periphery of the piston rod and the wall of the stuffing box respectively.

It is a further general object of my invention to provide a packing ring of the above character which will automatically adjust itself to irregularities in the piston rod, and which, under normal conditions, offers comparatively little or no frictional resistance to the movement of the piston rod so that the engine or other machine may be operated with a minimum consumption of fuel.

It is also an important object of the invention to provide a packing ring embodying in its structure a woven mineral or vegetable fiber, or a combination of the two, impregnated by a rubber solution, the complete ring being formed in one operation in a suitable mold, whereby it will be manifest that the article can be manufactured at relatively small cost.

With the above and other objects in view, my invention consists in the novel features of construction, combination and arrangement of parts to be hereinafter more fully described, claimed and illustrated in the accompanying drawing, in which, Figure 1 is a longitudinal section through a stuffing box, showing a series of my improved packing rings arranged therein;

Fig. 2 is an enlarged transverse vertical section through one of the rings; and

Fig. 3 is a detail perspective view of the packing ring.

In the manufacture of the packing ring, the several detail features of which will be hereinafter fully disclosed, I preferably employ a mixture of asbestos fiber and cotton fiber, which is spun into yarn, but I do not propose to restrict the present application to the use of fibrous material of the specific character referred to, as all cotton fiber may be used or all asbestos fiber employed as might be deemed advisable, or any other suitable vegetable fiber could be used with the asbestos. I find it preferable, however, to use a mixture of mineral and vegetable fiber woven into textile or cloth. To the woven sheet of fibrous material, a rubber solution is applied which thoroughly permeates the same, filling all interstices of the textile sheet and covering both faces thereof, providing what is in effect an adhesive coat on the fiber sheet. A section of this sheet is folded upon itself and a ring or annulus of suitable width cut therefrom. This ring or annulus is placed in a suitable mold, and the movable section of the mold is engaged between the folds of the packing material. A vulcanizing heat is applied to the mold and pressure then exerted upon the movable mold section or ring so that all portions of the packing material will be compressed into solid formation and the surfaces thereof caused to exactly conform to the contour of the mold body wall and the compressing or forming ring. While this explanation of the method of manufacture is here given so that the manner of producing my improved packing may be fully understood, as neither this method nor the mold constitute any part of the present invention, the latter is not illustrated in the accompanying drawing. It will suffice to state that after the ring has been formed in the manner stated, it is removed from the mold and then cut obliquely as indicated in Fig. 3, in the usual manner of such packing rings.

Referring now to the drawing, 5 designates the stuffing box formed on the cylinder head 6 in the usual manner, and provided on its outer end with a gland 7 which is connected to the flange of the stuffing box by the threaded bolts 8. 9 designates the piston rod extending through the central boss of the gland 7 which projects into the outer end of the stuffing box and through the opening 10 in the cylinder head.

My improved packing rings, generally indicated by the numeral 12, are arranged in nested relation within the stuffing box around the piston rod 9. The intermediate packing rings each have a relatively thick, medial annular portion 13 and a comparatively rigid edge portion 14 projecting centrally in one direction from the medial portion 13. Relatively thin, annular lips 15 extend in spaced, divergent relation to each other from the medial portion 12 of the ring and in an opposite direction with respect to the edge portion 14 thereof, and it is to be observed that the outer side faces of these lips are disposed on reversely inclined planes and the inner faces are outwardly curved at the edges of said lips to meet said outer faces and thereby provide the thin, marginal fins 16. The space between the inner opposed faces of the lips 15 provides a deep, annular chamber 17 in the packing ring. When the rings are arranged within the stuffing box, the rigid, annular edge portion 14 of one ring is seated within the chamber 17 of an adjacent ring and centrally upon the base wall of said chamber. Upon the adjustment of the gland 7 by means of the threaded bolts 8, the desired pressure may be exerted upon the series of rings and applied to the successive rings at their exact transverse center, so that the rings will not be distorted out of their true positions.

One of the terminal rings indicated at 18, adjacent to the opening 10, is not provided with the annular lips 15 but only with the relatively rigid, annular edge portion 14', while the other terminal ring 19 against which the gland 7 gears, is of U-shaped, channel form having only the flaring or diverging lips 15' to provide the annular chamber for the reception of the rigid edge portion 14 of the adjacent ring.

With the nested packing rings arranged in the stuffing box in the manner above stated, it will be appreciated that the relatively thin, flexible lips 15 are very sensitive to fluid pressures, and that it is not necessary to adjust the gland 7 to tightly compress the series of rings in order to prevent the escape of the fluid through the stuffing box. This is due to the provision of the annular chambers 17 in the rings. Such steam or other fluid as may pass through the opening 10 in the cylinder head and into the stuffing box will collect in the chamber of the first packing ring and exert a pressure against the diverging lips, forcing the fine edges or fins 16 thereon into tight frictional contact against the periphery of the piston rod and the wall of the stuffing box respectively, and thus effectually preventing the further passage of the fluid through the stuffing box chamber. These lips being highly sensitive to such fluid pressures, will conform to any irregularities in the surface of the piston rod or the wall of the stuffing box. The packing material employed in the construction of the rings is exceedingly durable and not affected by alkalis, steam, air, or hot or cold water, ammonia, or similar fluids, and is, therefore, well adapted for general practical service. Normally, when the lips 15 are not subjected to fluid pressure, only the fin-like edge of the inner lips of the packing rings engage upon the periphery of the piston rod, such engagement, however, offering practically no frictional resistance to the movement of the rod. Thus, wear of the piston rod is eliminated and, of course, the consumption of fuel in the operation of the engine or other machine also economized. Thus, by means of my improved packing ring, the necessity of tightly clamping the packing in the stuffing box and around the rod, which results in rapid wear of the packing and the necessity of frequent oiling to prevent overheating, is wholly obviated.

From the foregoing description, it will be seen that I have devised a very simple, serviceable and entirely practical packing ring construction which will automatically adjust itself to existing conditions, whether they be of a normal or abnormal character. By reason of the provision of the spaced annular lips which are exact counterparts of each other, being identical in form, size and structure, the packing ring is equally well adapted and serviceable for use where the wear may be on the outside of the packing ring instead of upon the inner edge thereof, as when the same is employed in connection with engine piston rods and like instrumentalities. It is, of course, apparent that the rings can be constructed of any desired cross-sectional area. The relative proportions of the several parts thereof should, however, be preferably adhered to. Nevertheless, I desire it to be understood that while I have herein referred to and described the several structural characteristics of my improved packing ring, modifications thereof may be resorted to whereby substantially the same result in practical use will be obtained, and I reserve the privilege of adopting all such legitimate changes in this respect as may be fairly embodied within the spirit and scope of the invention as claimed.

Having thus fully described my invention, what I desire to claim and secure by Letters Patent is:—

In a packing for stuffing boxes, a plurality of fibrous packing rings each having spaced, diverging, annular lips and a relatively rigid annular portion at the juncture of said lips adapted to seat against the body of an adjacent ring between the spaced lips thereof, the inner and outer side faces of the respective lips of each ring normally being out of frictional engagement with the movable part and the stuffing box wall respectively, the free edges of the respective lips only being in engagement with said parts.

In testimony whereof I hereunto affix my signature in the presence of two witnesses.

GEORGE PHILIP GREENOE.

Witnesses:
T. B. BOMAR,
JEM JONES.